United States Patent [19]

Matsumoto et al.

[11] Patent Number: 5,009,121
[45] Date of Patent: Apr. 23, 1991

[54] TELESCOPIC STEERING COLUMN DEVICE

[75] Inventors: Sakae Matsumoto, Takasaki; Mitsuo Ichikawa, Maebashi, both of Japan

[73] Assignee: Nippon Seiko Kabushiki Kaisha, Tokyo, Japan

[21] Appl. No.: 546,838

[22] Filed: Jul. 2, 1990

[30] Foreign Application Priority Data

Jul. 7, 1989 [JP] Japan .................................. 1-174064
Jul. 7, 1989 [JP] Japan .................................. 1-174065
Mar. 27, 1990 [JP] Japan .............................. 2-30559[U]

[51] Int. Cl.$^5$ .............................................. B62D 1/18
[52] U.S. Cl. ...................................... 74/493; 280/775; 74/492
[58] Field of Search .................... 74/492, 493; 280/775

[56] References Cited

U.S. PATENT DOCUMENTS

| 3,491,663 | 1/1970 | Morgan | 74/493 |
| 4,539,861 | 9/1985 | Nishikawa | 280/775 X |
| 4,890,505 | 1/1990 | Kinoshita et al. | 74/493 |
| 4,915,412 | 4/1990 | Yuzuriha et al. | 280/775 |

FOREIGN PATENT DOCUMENTS

| 66308 | 12/1982 | European Pat. Off. | 74/493 |
| 178470 | 8/1987 | Japan | 74/493 |
| 484978 | 5/1938 | United Kingdom | 74/493 |

Primary Examiner—Allan D. Herrmann
Assistant Examiner—Julie Krolikowski
Attorney, Agent, or Firm—Shapiro and Shapiro

[57] ABSTRACT

A telescopic steering column device comprising: a drive-side steering shaft; a driven-side steering shaft; a cylindrical inner column having an elongated hole in the axial direction; a cylindrical outer column having an opening corresponding the elongated hole in the inner column, fastened on the outer surface of the inner column so as to be telescopically combined with the inner column; a lock bracket having a thread hole corresponding the opening in the outer column; a lock member having a through hole at the central portion, the lock member being arranged to be fitted within the opening; and a lock screw having the inner portion which is engaged with the lock member and a projection which is formed at the central portion of the inner portion, which is rotatably inserted into the through hole of the lock member and which is inserted into the elongated hole in the inner column so that the axial displacement of the inner column with respect to the outer column is allowed while the rotation of the inner column with respect to the outer column is prevented, the lock screw being driven into the thread hole in the lock bracket, whereby the inner column is secured to the outer column by abutting the inner surface of the lock member against the outer surface of the inner column by adjusting the lock screw, and the inner column can be expanded/contracted by releasing the abutment.

3 Claims, 7 Drawing Sheets

FIG. I

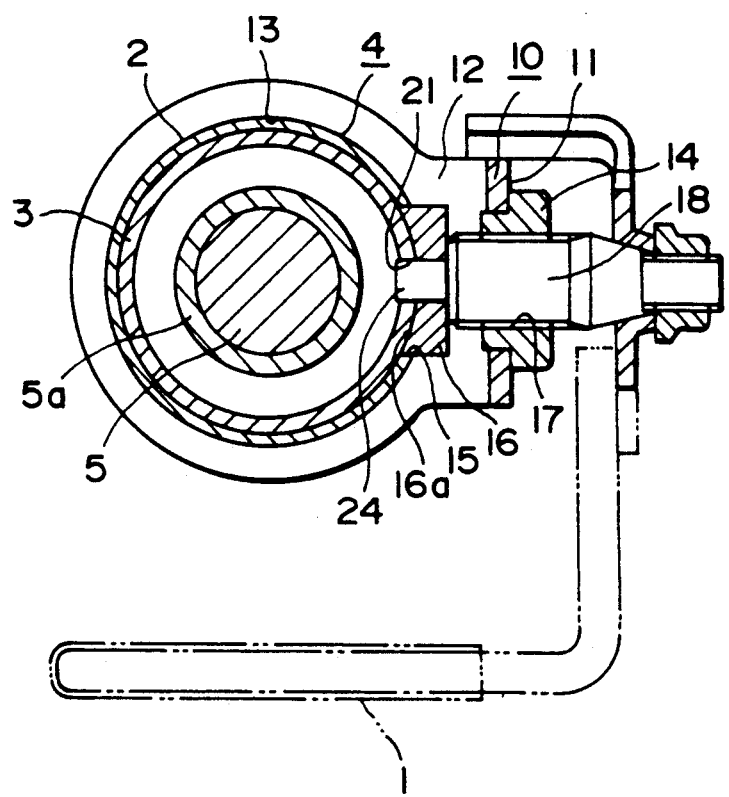
F I G. 13

TELESCOPIC STEERING COLUMN DEVICE

BACKGROUND OF THE INVENTION

1. Field of the Invention

The present invention relates to a telescopic steering column device, and, more particularly, to a telescopic steering column device arranged in such a manner that the overall length of the steering column through which steering shaft passes can be expanded/contracted so as to adjust the position of a steering wheel disposed at the end portion of the steering shaft for the purpose of being fitted to the body of a driver or the attitude of a driver.

2. Related Background Art

Hitherto, there has been a known telescopic steering column device arranged in such a manner that the position of the steering wheel can be adjusted so as to be fitted to the body of a driver or the attitude of a driver.

FIGS. 1 to 3 illustrate an example of a telescopic steering column of the type described above.

Referring to FIGS. 1 to 3, reference numeral 1 represents an adjust lever of the telescopic steering column device with which the locked state can be cancelled when it is operated at the time of performing an adjustment operation. With the thus realized cancelled state maintained, the overall length of a steering column 4, constituted by telescopically combining an outer column 2 with an inner column 3, is expanded/contracted. As a result, an end portion of a steering shaft 5 which is also telescopically constituted is displaced in a direction designated by an arrow a shown in FIGS. 1 and 2 so that the longitudinal position of a steering wheel (omitted from illustration) secured to the end portion of the steering shaft 5 is adjusted.

That is, the steering column 4 forming the telescopic steering column device is constituted by the outer column 2 and the inner column 3 each of which is in the form of a cylinder and which are telescopically combined with each other.

A drive-side steering shaft 5a, to which the steering wheel is fastened, is borne on the inner side of the inner column 3 via a pair of rolling bearings 7 and 8. The steering shaft 5a has a spline fastening portion 9 formed so as to be engaged with a driven-side steering shaft 5b. As a result, the drive-side steering shaft 5a is expanded/contracted with respect to the position of the driven-side steering shaft 5b in accordance with the expansion/contraction of the steering column 4.

A lock bracket 10, formed by bending a metal plate into a U-shape facing sidewards, is secured to the intermediate portion of the outer column 2. That is, the two side portions of a supporting plate portion 11 disposed in the central portion of the lock bracket 10 are bent perpendicularly in the same direction so that fastening plate portions 12 are formed. When the lock bracket 10 thus arranged is secured to the outer column 2, the outer column 2 is inserted into circular holes 13 formed in each of the fastening portions 12. Furthermore, the portions around the circular holes 13 and the outer surface of the outer column 2 are welded to one another.

A nut member 14 is secured to the central portion of the supporting plate portion 11 projecting to the side portion (downwards when viewed in FIG. 2 and to the left when viewed in FIG. 3) of the outer column 2, the lock bracket 10 being secured to the intermediate portion of the outer column 2.

A rectangular opening 15 is formed in the side surface of the outer column 2 at a position corresponding the nut member 14. A lock member 16 is positioned within the opening 15 in such a manner that the lock member 16 can be moved inwards and outwards (in the vertical direction when viewed in FIG. 2 and in the lateral direction when viewed in FIG. 3). An inner surface 16a of the lock member 16 thus positioned within the opening 15 is arranged to be in the form of a recess of a circular arc, the inner surface 16a being brought into contact with the outer surface of the inner column 3.

A lock screw 18 is fitted in a thread hole 17 formed in the nut member 14 secured to the central portion of the supporting plate portion 11. The inner end surface of the lock screw 18 (the lower end surface when viewed in FIG. 2 and the left end surface when viewed in FIG. 3) is positioned in contact with the outer surface of the lock member 16. Furthermore, the base portion of the adjust lever 1 is secured to the outer end surface of the lock screw 18. As a result, when the adjust lever 1 is operated and the lock screw 18 is thereby rotated, the inner surface 16a of the lock member 16 can be abutted against the outer surface of the inner column 3 and can be separated from the same.

A projection portion 20 is formed on the inner surface of the lock member 16, while an elongated hole 21 elongating in the axis direction (in the lateral direction when view in FIG. 2 and the perpendicular direction to the drawing sheet of FIG. 3) is formed in the side surface of the inner column 3 at the position corresponding the projection portion 20. The thus formed projection portion 20 is positioned loosely in the elongated hole 21 so that the axial displacement of the inner column 3 with respect to the position of the outer column 2 is allowed and its rotation in the torsional direction is prevented.

The overall length of the steering column 4 of the telescopic steering column device thus constituted is adjusted as follows:

First, the adjust lever 1 is operated so as to rearwards (to the left when viewed in FIG. 3) move the lock screw 18, causing the force with which the lock member 16 is abutted against the outer surface of the inner column 3 to be released. As a result, a state in which the inner column 3 can be freely moved inside the outer column 2 is realized.

With the above-described state maintained, a steering wheel (omitted from illustration) secured to an end portion of the drive-side steering shaft 5a is pushed or drawn so that the longitudinal position of the steering wheel is adjusted. In accordance with the pushing or drawing of the steering wheel, the relative position from the driven-side steering shaft 5b is displaced by the spline fastening portion 9 disposed in the intermediate portion of the drive-side steering shaft 5a. Furthermore, the inner column 3, disposed on the outer surface of the drive-side steering shaft 5a via the pair of rolling bearings 7 and 8, is longitudinally displaced.

If the longitudinal positional adjustment of the steering wheel has been completed as a result of the above-described operation, the adjust lever 1 is operated so that the lock screw 18 is moved forwards (to the right when viewed in FIG. 3). The thus moved lock screw 18 abuts the lock member 16 against the outer surface of the inner column 3. As a result, large frictional force acts between the inner surface 16a of the lock member 16 and the outer surface of the inner column 3, causing the inner column 3 to be supported on the inside of the outer column 2 in such a manner that the inner column 2 cannot be displaced. Therefore, the state in which the steering wheel is supported at a position after the adjustment is maintained.

However, the conventional telescopic steering column device structured and operated as described above arises the following problems to be overcome:

The inner column 3 which can be displaced within the outer column 2 is arranged to be able to be displaced in the axial direction (in the lateral direction when viewed in FIG. 2) but it must be arranged so as not to rotate in the torsional direction.

Therefore, in the case of the conventional telescopic steering column device shown in FIGS. 2 and 3, a projection portion 20 is formed on the inner surface of the lock member 16, while an elongated hole 21 elongating in the axis direction (in the lateral direction when view in FIG. 2 and the perpendicular direction to the drawing sheet of FIG. 3) is formed in the side surface of the inner column 3 at the position corresponding the projection portion 20. The thus formed projection portion 20 is positioned loosely in the elongated hole 21 so that the axial displacement of the inner column 3 with respect to the position of the outer column 2 is allowed and its rotation in the torsional direction is prevented.

However, it is a complicated work to form the projection portion 20 on the inner surface 16a of the lock member 16 since the inner surface 16a is in the form of a recess of a circular arc. Therefore, the cost for manufacturing the lock member 16 is raised, causing the overall cost for manufacturing the telescopic steering column device to be raised excessively.

Furthermore, as shown in FIG. 4, the conventional structure has been arranged in such a manner that a fastening pin 22 is secured to a portion of the outer column 2 at a position which does not correspond to the above-described opening 15. In addition, the front portion of the thus secured fastening pin 22 and the elongated hole 21 formed in the inner column 3 are loosely engaged with each other so that the axial displacement of the inner column 3 with respect to the position of the outer column 2 is allowed and the rotation of it in the torsional direction is prevented.

However, the second structure shown in FIG. 4 arises a problem in that the cost for manufacturing the telescopic steering column device of this type cannot be satisfactorily reduced since the number of the necessary parts is increased and the part administration and the assembling work become too complicated.

Furthermore, in the conventional telescopic steering column device, the inner diameter of the outer column 2 and the outer diameter of the inner column 3 have been made substantially the same so that the looseness of the inner column 3 in the fixed outer column 2 has been prevented. However, if force for pushing a portion of the inner column 3 is applied due to bending or the like of the steering shaft 5, the frictional force acting between the outer surface of the inner column 3 and the inner surface of the outer column 2 is thereby enlarged. As a result, the steering column 4 is expanded/contracted, causing a problem to be arisen in that the force necessary to displace the inner column becomes too large.

In order to improve the rigidity of the steering column 4 against the force acting in the bending direction, it is effective to elongate length L (see FIG. 12) in which the outer column 2 and the inner column 3 are fastened to each other, the outer column 2 and the inner column 3 constituting the steering column 4.

Furthermore, the distance between the pair of the rolling bearings 7 and 8 cannot be enlarged excessively, the pair of the rolling bearings 7 and 8 being acting to rotatably bearing the steering shaft 5a on the inside of the inner column 3. For example, the rolling bearing 7 on the steering wheel side (on the right side when viewed in FIG. 12) cannot be excessively shifted to right because a variety of switches such as a direction indicator are positioned there.

On the other hand, the excessive shift of the roller bearing 8 positioned opposite to the steering wheel (on the left side when viewed in FIG. 12) encounters a limitation because it is necessary for the amount of the expansion/contraction of the steering column 4 to be secured. That is, as shown in FIGS. 5 and 12, the telescopic steering column device is usually used in combination with a so-called neck-swinging tilt steering which moves relative to a lateral shaft 25 positioned in a relatively upper portion of the steering column device. The neck-swinging tilt steering of the type described above must have a universal joint 26 (see FIG. 12) on an extension line from the above-described lateral shaft 25 so as to establish a connection between the lower end portion of the driven-side steering shaft 5b and the top portion of the lower steering shaft 27. The outer diameter of the portion in which the universal joint 26 is positioned necessarily has a certain degree. Therefore, if a cylindrical portion 6 of the driven-side steering shaft 5a, which supports the inner surface of the roller bearing 8, is extended to the left when viewed in the drawing for the purpose of shifting the roller bearing 8 to the left, distance 1 between the end surface of the cylindrical portion 6 and the portion in which the above-described universal joint 26 is positioned is shortened. As a result, the amount of expansion/contraction of the steering column 4 must be undesirably reduced.

In order to elongate the fastening length L between the outer column 2 and the inner column 3 without shifting the positions of the rolling bearings 7 and 8, it might be considered feasible to employ a structure in which the end portion of the inner column 3 inserted into the outer column 2 is arranged to project over the roller bearing 8. However, the above-described structure in which the end portion of the inner column 3 is simply arranged to project over the roller bearing 8 arises a problem in that the frictional force acting between the outer surface of the inner column 3 and the inner surface of the outer column 2 becomes too large.

That is, in the case where the end portion of the inner column 3 is, as shown in FIG. 6, simply projected over the roller bearing 8, the end portion of the inner column 3 is outwardly expanded as designated by an arrow b shown in FIG. 6, when the roller bearing 8 is press-fitted into the inner portion of the inner column 3. The outer surface of the thus expanded end portion of the inner column 3 is strongly abutted against the inner surface of the outer column 2, causing the frictional force to act on the inner surface. Therefore, the force necessary to expand/contract the steering column 4 becomes too large.

In order to prevent the above-described problem in that the end portion of the inner column 3 is expanded when the roller bearing 8 is press-fitted, it might be considered feasible to employ a structure in which the outer surface of the end portion of the inner column is, as shown in FIG. 7, recessed so as to reduce the thickness. In this case, another problem arises in that the rigidity of the steering column 4 against bending force becomes unsatisfactory since the fastening length between the outer column 2 and the inner column 3 becomes too short.

SUMMARY OF THE INVENTION

The telescopic steering column device according to the present invention comprises, similarly to the conventional telescopic steering column device, an outer column and an inner column each of which is in the form of a cylinder and which are telescopically combined with each other. The telescopic steering column device according to the present invention further comprises a lock bracket secured to the intermediate portion of the outer column in such a manner that a supporting plate portion formed in a portion thereof is projected to the side portion of the outer column. The telescopic steering column device according to the present invention further comprises a nut member secured to the central portion of the supporting plate portion and an opening formed in the side surface of the outer column in a portion corresponding the nut member. The telescopic steering column device according to the present invention further comprises a lock screw which is driven into the nut member, the inner surface of which is engaged with the lock member and to which the base portion of an adjust lever is secured to the outer end portion thereof.

However, according to the telescopic steering column device according to the present invention, a through hole is formed at the central portion of the lock member and a projection which can be rotatably pass through the through hole is formed at the central portion of the inner surface of the lock screw. Furthermore, an elongated hole is formed in the side surface of the inner column in a portion corresponding the projection. In addition, the inner end portion of the projection projecting over the inner surface of the lock member is loosely fitted within the elongated hole.

The operation for adjusting the length of the steering column, performed in the telescopic steering column device according to the present invention and constituted as described above, is performed similarly to that performed by the above-described conventional telescopic steering column device.

The telescopic steering column device according to the present invention is further arranged in such a manner that the portion, which is the inner end portion of the projection formed at the central portion on the inner surface of the lock screw, projecting over the inner surface of the lock member is loosely positioned within the elongated hole formed in the inner column. As a result, the axial displacement of the inner column with respect to the position of the outer column is allowed but the rotation of the inner column in the torsional direction is prevented.

The function of the telescopic steering column device according to the present invention is substantially the same as that of the above-described conventional device. However, the forming of the circular projection in the central portion of the inner surface of the lock screw or the forming of the through hole in the lock member according to the present invention for the purpose of preventing the rotation of the inner column is extremely easy. Furthermore, the number of necessary parts for forming the rotation stopping mechanism portion can be reduced. Therefore, the cost for manufacturing the rotation stopping mechanism can be reduced.

The telescopic steering column device according to the present invention comprises, similarly to the conventional telescopic steering column device, an outer column and an inner column each of which is in the form of a cylinder and which are telescopically combined with each other. The telescopic steering column device according to the present invention further comprises a lock bracket secured to the intermediate portion of the outer column in such a manner that a supporting plate portion formed in a portion thereof is projected to the side portion of the outer column. The telescopic steering column device according to the present invention further comprises a thread hole formed at the central portion of the supporting plate portion and an opening formed in the side surface of the outer column in a portion corresponding the thread hole. The telescopic steering column device according to the present invention further comprises a lock member which is brought into contact with the outer surface of the inner column in the opening portion and a lock screw which is driven into the thread hole, the inner surface of which is engaged with the lock member and to which the base portion of an adjust lever is secured to the outer end portion thereof.

However, according to the telescopic steering column device according to the present invention, the inner diameter of the outer column is arranged to be larger than the outer diameter of the inner column by a certain degree. Furthermore, a small-diameter portion the inner diameter of which is substantially the same as the outer diameter of the inner column is formed at the end portion of the outer column. The inner surface of the small-diameter portion is brought into contact with the outer surface of the intermediate portion of the inner column.

Since the telescopic steering column device according to the present invention is arranged in such a manner that the inner diameter of the outer column is made larger than the outer diameter of the inner column by a certain degree, large frictional force does not act between the outer surface of the inner column and the inner surface of the outer column even if force which pushes a portion of the inner column is applied due to a warp or the like of the steering shaft. Therefore, the work for expanding/contracting the steering column can be completed with small force.

In the case where the inner column is secured with respect to the position of the outer column, the outer surface of the inner column is brought into contact with the inner surface of the outer column at two positions, that is, the small-diameter portion formed at the end portion of the outer column and the front portion of the inner column. Therefore, the looseness of the outer column with respect to the inner column can be assuredly prevented.

The telescopic steering column device according to the present invention comprises, similarly to the conventional telescopic steering column device, an outer column and an inner column each of which is in the form of a cylinder and which are telescopically combined with each other. The telescopic steering column device according to the present invention further comprises a steering shaft which is rotatably supported inside the inner column via a pair of rolling bearings, the steering shaft being able to expand/contract by a spline fastening portion formed in a portion thereof. Furthermore, a portion, which is an end portion of the inner column and which is inserted into the outer column, is projected over either of the pair of rolling bearings. In addition, a portion of the outer surface of the inner column and positioned around the either of the pair of the rolling bearings is recessed all round except for the projection so as to reduce the thickness.

According to the thus constituted telescopic steering column device according to the present invention, the outer surface of the portion which is the end portion of the inner column and projecting over the rolling bearing is brought into contact with the inner surface of the outer column. Therefore, the rigidity of the steering column comprising the inner column and the outer column against bending can be improved without a necessity of shifting the positions of the pair of rolling bearings.

Furthermore, the thickness of the portion around the rolling bearing which supports the side end portion of the projection portion of the inner column is reduced. Therefore, the force enlarging the outer diameter does not act on the above-described projection portion after the rolling bearing has been press-fitted into the inner column. As a result, the force necessary for expanding-/contracting the steering column can be restricted.

Other and further objects, features and advantages of the invention will be appear more fully from the following description.

BRIEF DESCRIPTION OF THE DRAWINGS

FIGS. 8 and 9 illustrate a first embodiment of the present invention, wherein FIG. 8 illustrates the portion E shown in FIG. 2 and FIG. 9 is a cross sectional view taken along line IX—IX of FIG. 8;

FIGS. 10 and 11 illustrate a second embodiment of the present invention, wherein FIG. 10 illustrates a state in which the steering column is expanded/contracted and FIG. 11 illustrates a state in which the position of an inner column is fixed with respect to the position of an outer column, each of FIGS. 10 and 11 being a view A of FIG. 1 from which a portion is omitted;

FIG. 13 is an enlarged cross sectional view taken along line XIII—XIII of FIG. 5.

DESCRIPTION OF THE PREFERRED EMBODIMENTS

A first embodiment of the present invention will now be described in detail.

Figure 2:
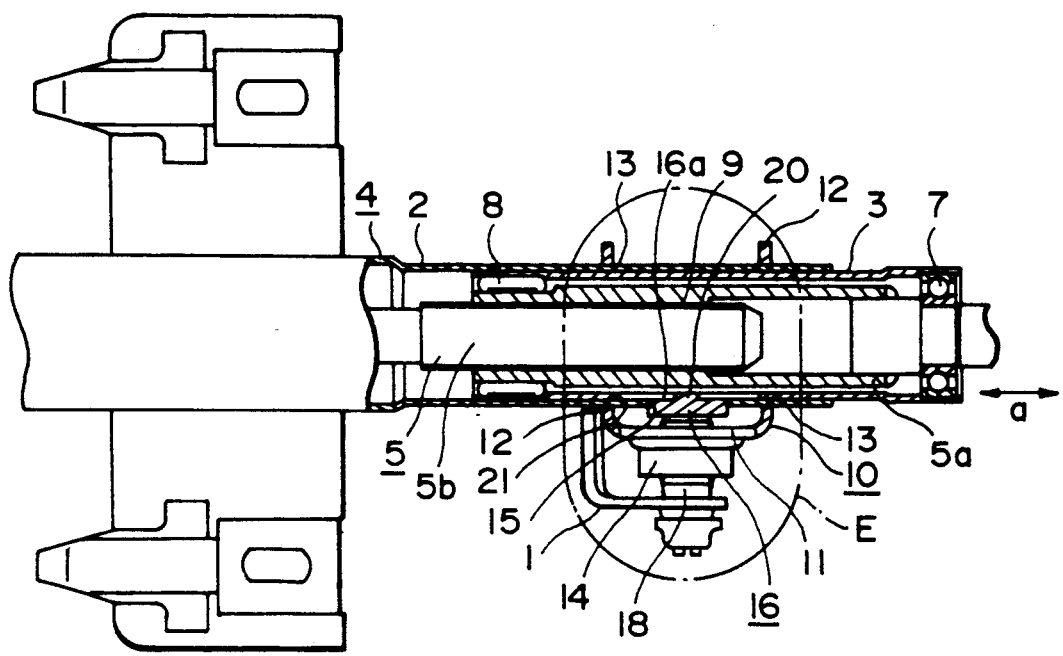
FIG. 2 is a view A of FIG. 1 which illustrates the conventional telescopic steering column device.
Figure 8:
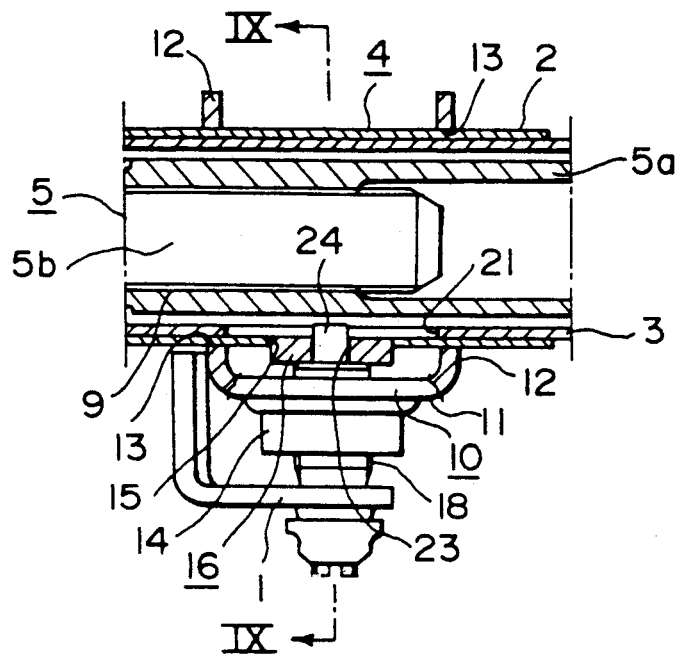
Figure 9:
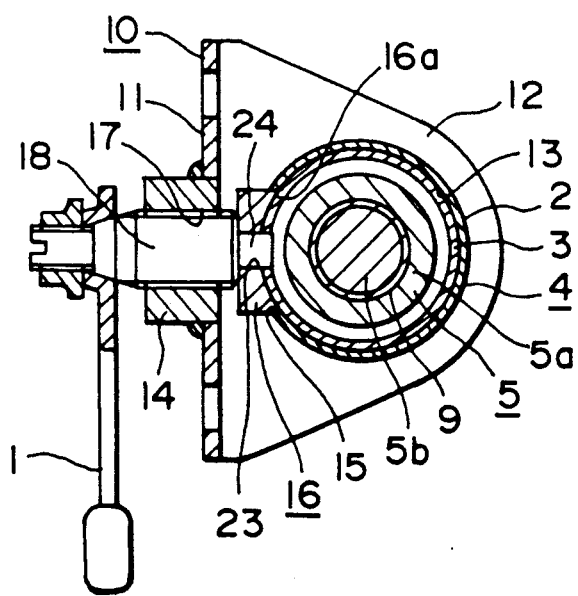

FIGS. 8 and 9 illustrate a first embodiment of the present invention, wherein FIG. 8 illustrates the portion E shown in FIG. 2 and FIG. 9 is a cross sectional view taken along line IX—IX of FIG. 8.

A steering column 4, constituting a telescopic steering column device according to the present invention, comprises an outer column 2 and an inner column 3 each of which is in the form of a cylinder and which are telescopically combined with each other. A drive-side steering shaft 5a, to which a steering wheel (omitted from illustration) is fastened, is supported on the inner side of the inner column 3 via a pair of rolling bearings 7 and 8. A spline fastening portion 9, which can be engaged with a driven-side steering shaft 5b, is formed in the drive-side steering shaft 5a so that the drive-side steering shaft 5a can be expanded/contracted with respect to the driven-side steering shaft 5b in accordance with the expansion/contraction of the steering column 4. Furthermore, the rotation of the drive-side steering shaft 5a can be transmitted to the driven-side steering shaft 5b.

In addition, a lock bracket 10 is, as shown in FIGS. 8 and 9, secured to the outer surface of the intermediate portion of the outer column 2. The lock bracket 10 is formed by bending a metal plate into a U-shape facing sidewards so that a supporting plate portion 11 is formed at the central portion thereof and fastening plate portions 12 are formed on the two sides of the supporting plate portion 11, the two fastening plate portions 12 being bent perpendicularly to the supporting plate portion 11. The lock bracket 10 thus constituted is secured to the outer surface of the intermediate portion of the outer column 2 in such a manner that the outer column 2 is inserted into circular holes 13 formed in the corresponding fastening plate portions 12 and the portions around the circular holes 13 are welded to the outer surface of the outer column 2.

With maintaining the above-described state in which the lock bracket 10 is secured to the outer surface of the intermediate portion of the outer column 2, a nut member 14 is secured to the central portion of the supporting plate portion 11 projecting sidewards (downwards when viewed in FIG. 8 and to the left when viewed in FIG. 9). As an alternative to the structure in which the nut member 14 is employed, a thread hole may be formed in the lock bracket 10.

A rectangular opening 15 is formed on the side surface of the outer column 2 in a portion corresponding the nut member 14. Furthermore, a lock member 16 is positioned within the opening 15 in such a manner that the lock member 16 can be displaced inwards/outwards (in the vertical direction when viewed in FIG. 8 and in the lateral direction when viewed in FIG. 9) An inner surface 16a of the lock member 16, which is positioned within the opening 15 as described above, is formed into a recess of a circular arc. The inner surface 16a thus arranged is positioned in contact with the outer surface of the inner column 3.

A lock screw 18 is driven into a thread hole 17 formed in the nut member 14 secured to the central portion of the supporting plate portion 11. The inner surface (the top surface when viewed in FIG. 8 and the right end surface when viewed in FIG. 9) of the lock screw 18 is brought into contact with the outer surface of the lock member 16. The base portion of an adjust lever 1 is secured to the outer surface of the lock screw 18. As a result, when the lock screw 18 is rotated by operating the adjust lever 1, the inner surface 16a of the lock member 16 can be abutted against the outer surface of the inner column 3.

The above-described structure is arranged similarly to the above-described conventional telescopic steering column device. The telescopic steering column device according to the present invention is further arranged in such a manner that a circular through hole 23 is formed in the central portion of the lock member 16 and a cylindrical projection 24, which can be rotatably inserted into the through hole 23, is formed in the central portion of the inner surface of the lock screw 18.

An elongated hole 21 elongated in the axial direction in the side surface of the inner column 3 is formed in a portion corresponding the projection 24. Furthermore, the portion projecting over the inner surface 16a of the lock member 16 is loosely fitted within the elongated hole 21, the portion being a portion of the inner end portion of the projection 24.

The operation for adjusting the length of the steering column 4, performed in the telescopic steering column device according to the present invention and constituted as described above, is performed similarly to that performed by the above-described conventional telescopic steering column device.

That is, the adjustment operation is conducted in such a manner that the adjust lever 1 the base portion of which is secured to the outer end portion of the lock screw 18 is operated so that the lock screw 18 is moved rearwards (downwards when viewed in FIG. 8 and to the left when viewed in FIG. 9). The lock screw 18 releases the force which abuts the lock member 16 against the outer surface of the inner column 3. As a result, a state is realized in which the inner column 3 can be freely displaced in the outer column 2.

In this state, a steering wheel (omitted from illustration) secured to an end portion of the drive-side steering shaft 5a is pushed or drawn so that the longitudinal position of the steering wheel is adjusted. In accordance with the pushing/drawing of the steering wheel, the spline fastening portion 9 disposed at the intermediate portion of the steering shaft 5 is displaced. Furthermore, the inner column 3 disposed on the outer surface of the steering shaft 5a via the pair of rolling bearings 7 and 8 is longitudinally displaced.

When the longitudinal position of the steering wheel has been thus adjusted, the adjust level 1 is operated so as to move the lock screw 18 in the forward direction (in the upward direction when viewed in FIG. 8 and to the right when viewed in FIG. 9). As a result, the inner surface of the lock screw 18, which is positioned around the above-described projection 24, abuts the lock member 16 against the outer surface of the inner column 3. Therefore, large frictional force acts between the inner surface 16a of the lock member 16 and the outer surface of the inner column 3. As a result, the inner column 3 is supported inside the outer column 2 in such a manner that the inner column 3 cannot be displaced and the steering wheel is thereby supported at the adjusted position.

The telescopic steering column device according to the present invention is further arranged in such a manner that the portion, which is the inner end portion of the projection 24 formed at the central portion on the inner surface of the lock screw 18, projecting over the inner surface 16a of the lock member 16 is loosely positioned within the elongated hole 21 formed in the inner column 3. As a result, the axial displacement of the inner column 3 with respect to the position of the outer column is allowed but the rotation of the inner column in the torsional direction is prevented.

The function of the telescopic steering column device according to the present invention is substantially the same as that of the above-described conventional device.

Figure 3:
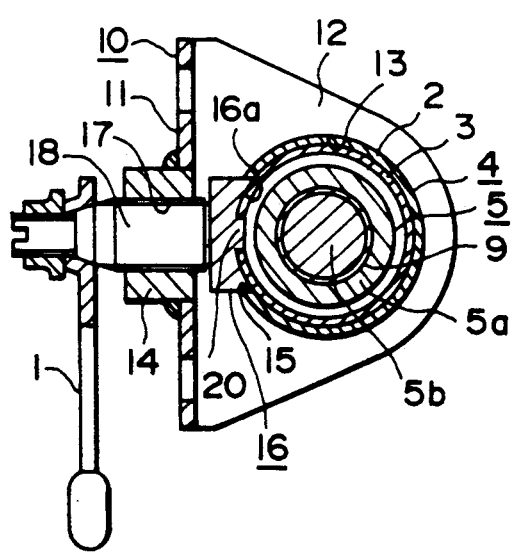
FIG. 3 is a cross sectional view taken along line III—III of FIG. 1.
Figure 4:
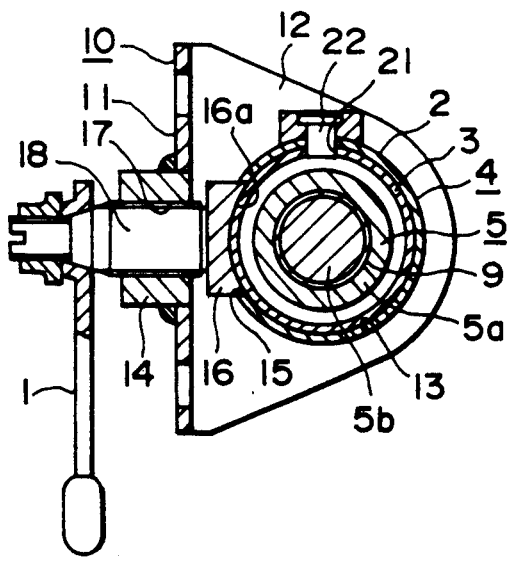
FIG. 4 illustrates another conventional telescopic steering column device in a manner similar to FIG. 3.
Figure 5:
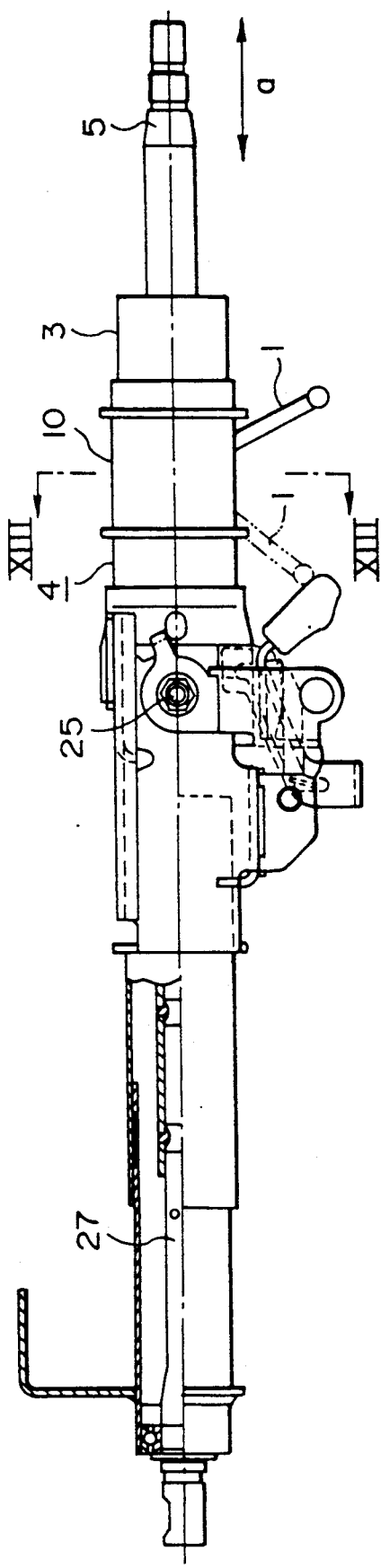
FIG. 5 is a side elevational view which illustrates another example of the telescopic steering column device to which the present invention is applied.
Figure 7:
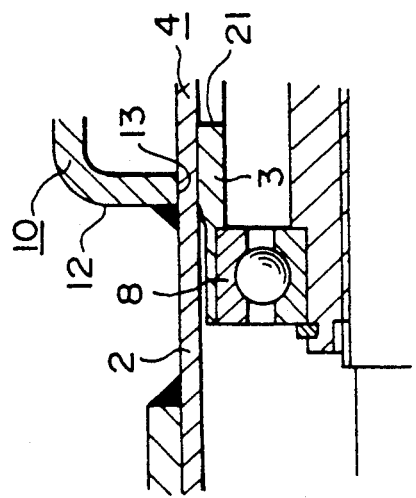
FIGS. 6 and 7 are cross sectional views which illustrate the structure of a portion including a roller bearing 8 employed in the present invention.
Figure 6:
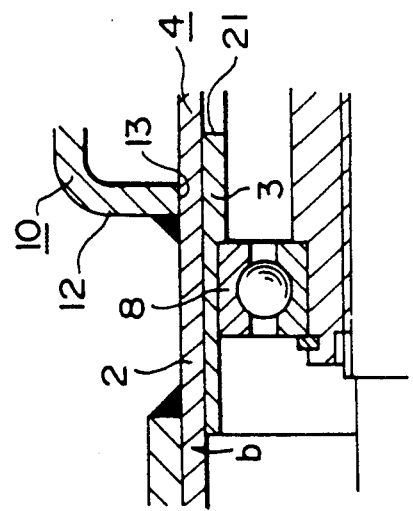

However, the forming of the circular projection 24 as shown in FIGS. 8 and 9 in the central portion of the inner surface of the lock screw 18 or the forming of the through hole 23 in the lock member 16 according to the present invention for the purpose of preventing the rotation of the inner column 3 inside the outer column 2 is extremely easier than the forming of the recessed portion 20 in the inner surface 16a of the lock screw 16 as shown in FIG. 2 and 3. Furthermore, the number of necessary parts for forming the rotation stopping mechanism portion can be reduced with respect to the structure in which the fastening pin 22 is disposed at a position away from the lock member 16 as shown in FIG. 4. Therefore, the cost for manufacturing the rotation stopping mechanism can be reduced.

Since the telescopic steering column device according to the first embodiment of the present invention is constituted as described above, the rotation of the inner column in the torsional direction can be prevented with allowing the axial displacement of the inner column with respect to the position of the outer column with eliminating the necessity of performing the complicated work for each of the elements or the necessity of increasing the number of necessary parts eliminated. As a result, the overall cost of the telescopic steering column device can be reduced.

Figure 1:
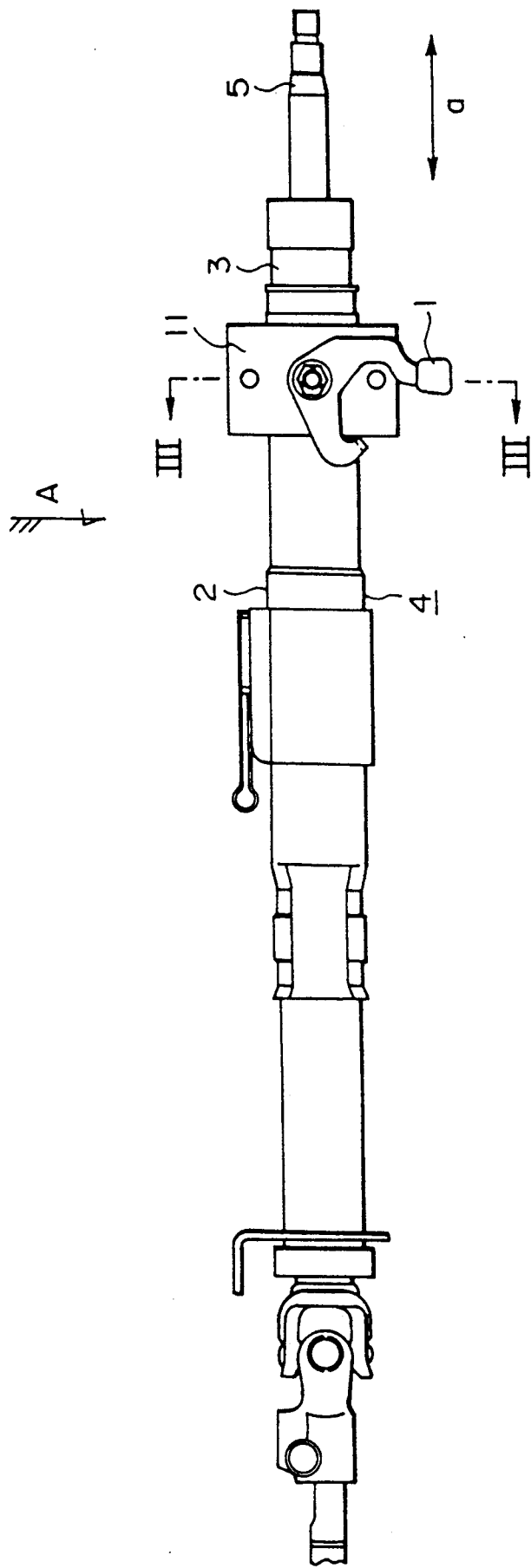
FIG. 1 is a side elevational view which illustrates a steering device which includes a telescopic steering column device.
Figure 10:
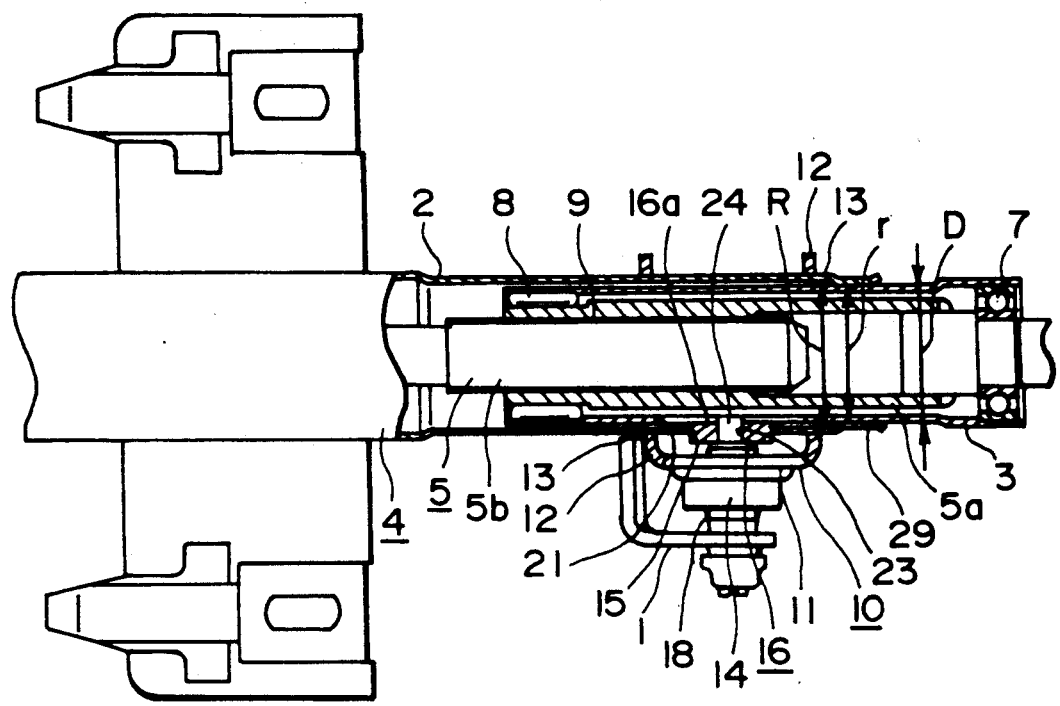
Figure 11:
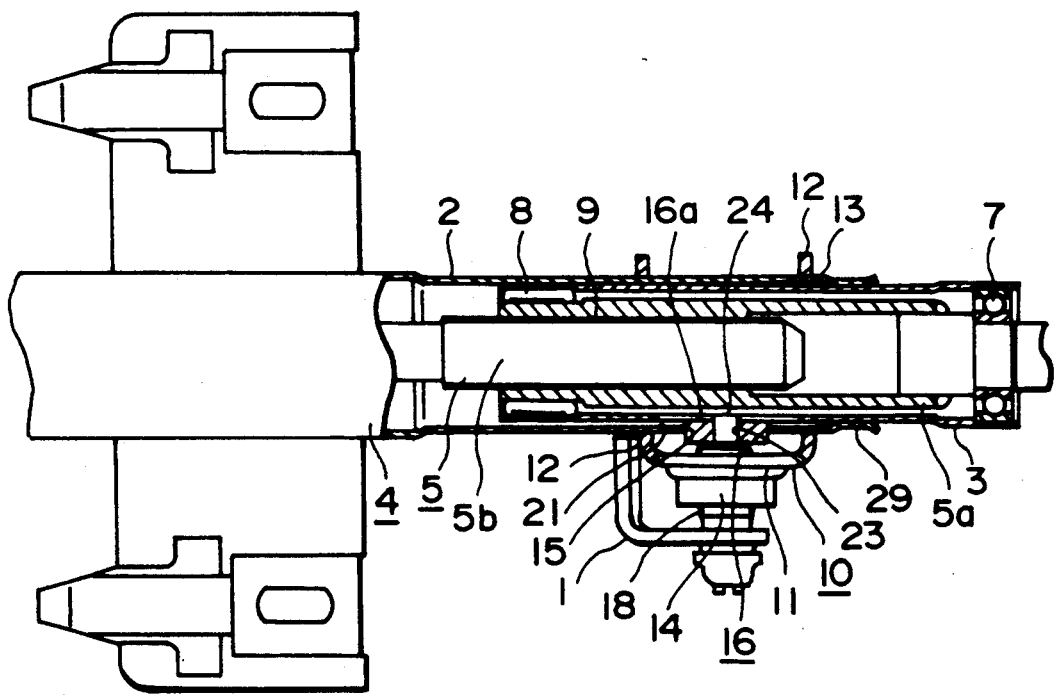

FIGS. 10 and 11 illustrate a second embodiment of the present invention, where FIG. 10 illustrates a state in which the steering column is expanded/contracted and FIG. 11 illustrates a state in which the inner column is fixed with respect to the position of the outer column, FIGS. 10 and 11 respectively being view A of FIG. 1 from which a portion is omitted.

The same elements as those according to the first embodiment are given the same reference numerals.

According to the second embodiment of the present invention of the telescopic steering column device, the inner diameter R of the outer column 2 is arranged to be larger ($R > D$), by a certain degree, than the outer diameter D of the inner column 3. Furthermore, a drawn small-diameter portion 29, the inner diameter r of which is substantially equal ($r = D$) to the outer diameter D of the inner column 3, is formed at the end portion (at the right end portion when viewed in FIGS. 10 and 11) of the column 2 at the steering wheel side. Furthermore, the inner surface of the drawn small-diameter portion 29 is movably positioned in contact with the outer surface of the intermediate portion of the inner column 3.

The operation for adjusting the length of the steering column 4 performed in the telescopic steering column device according to the present invention and constituted as described above is substantially the same as that performed by the above-described conventional telescopic steering column device.

That is, the adjustment operation is performed in such a manner that the adjust lever 1, the base portion of which is secured to the outer end portion of the lock screw 18, is first operated so that the lock screw 18 is moved rearwards (downwards when viewed in FIGS. 10 and 11). The lock screw 18 releases the force abutting the lock member 16 against the outer surface of the inner column 3. As a result, a state is realized in which the inner column 3 can be freely displaced inside the outer column 2.

With the above-described state maintained, the steering wheel (omitted from illustration) secured to an end portion of the drive-side steering shaft 5a is pushed or drawn so that the longitudinal position of the steering wheel is adjusted. The spline fastening portion 9, which can be engaged with the driven-side steering shaft 5b in accordance with the pushing/drawing of the steering wheel, is provided for the drive-side steering shaft 5a. As a result, the drive-side steering shaft 5a is displaced with respect to the position of the driven-side steering shaft 5b. Furthermore, the inner column 3 disposed on the outer surface of the drive-side steering shaft 5a via the pair of rolling bearings 7 and 8 is longitudinally displaced.

However, according to this embodiment of the present invention of the telescopic steering column device, the inner diameter R of the outer column 2 is arranged to be larger than the outer diameter D of the inner column 3 by a certain degree. Therefore, large frictional force does not act between the outer surface of the inner column 3 and the inner surface of the outer column 2 even if force outwards pushing a portion of the inner column 3 is applied. Therefore, the work for expanding-/contracting the steering column can be completed with small force.

That is, in a state in which force abutting the lock member 16 against the outer surface of the inner column 3 has been released, the outer surface of the inner column 3 and the inner surface of the outer column 2 is positioned in contact with each other only in a small area, that is, the above-described drawn small-diameter portion 29. Therefore, the work for expanding/contracting the steering column 4 can be completed with small force as described above.

When the longitudinal position of the steering column has been adjusted as a result of the displacement of the inner column 3 with respect to the position of the outer column 2, the adjust lever 1 is operated so as to forwards (upwards when viewed in FIGS. 10 and 11) move the lock screw 18. As a result, the portion of the inner surface of the lock screw 18 abuts the lock member 16 against the outer surface of the inner column 3, the portion being the portion around the projection 24. Therefore, large frictional force acts between the inner surface 16a of the lock member 16 and the outer surface of the inner column 3. As a result, the inner column 3 can be supported inside the outer column 2 in such a manner that the inner column 3 cannot be displaced. Therefore, the state in which the steering wheel is positioned at the adjusted position is maintained.

In the case where the inner column 3 is, as described above, secured with respect to the position of the outer column 2, the outer surface of the inner column 3 is brought into contact with the inner surface of the outer column 2 at two positions, that is, the drawn small-diameter portion 29 formed at the end portion of the outer column 2 and the front portion (the left end portion shown in FIGS. 10 and 11) of the inner column 3. Therefore, the looseness of the outer column 2 with respect to the inner column 3 can be assuredly prevented.

Since small bending force corresponding to the inclination of the inner column 3 acts on the steering shaft 5 rotatably supported on the inside of the inner column 3, the looseness of the spline fastening portion 9 formed in the intermediate portion of the steering shaft 5 can be prevented.

Since the telescopic steering column device according to the second embodiment of the present invention is constituted as described above, the enlargement of force necessary to move the inner column with respect to the position of the outer column due to a warp or the like of the steering shaft or the like can be prevented. Therefore, the work for expanding/contracting the steering column can be completed with small force regardless of the existence of a warp of the steering shaft or the like.

Next, a third embodiment of the present invention will be described with reference to FIGS. 12 and 13.

The same elements as those according to the first embodiment are given the same reference numerals.

The end portion (the left end portion when viewed in FIG. 12) of the inner column 3 opposite to the steering wheel (omitted from illustration) and inserted into the outer column 2 is projected over the roller bearing 8 which supports the above-described end portion on the outer surface of the cylindrical portion 6 of the drive-side steering shaft 5a, the portion being projected in the direction opposite to the steering wheel. Furthermore, the outer surface of a projection portion 3a is arranged to be brought into contact with the inner surface of the outer column 2.

In addition, a portion 3b of the outer surface of the inner column 3 and positioned around the roller bearing 8 is recessed all round except for the projection portion 3a so that the thickness of the portion 3b is reduced.

The operation for adjusting the length of the steering column 4, performed in the telescopic steering column device according to the present invention and constituted as described above, is performed similarly to that performed by the above-described conventional telescopic steering column device.

Figure 12:
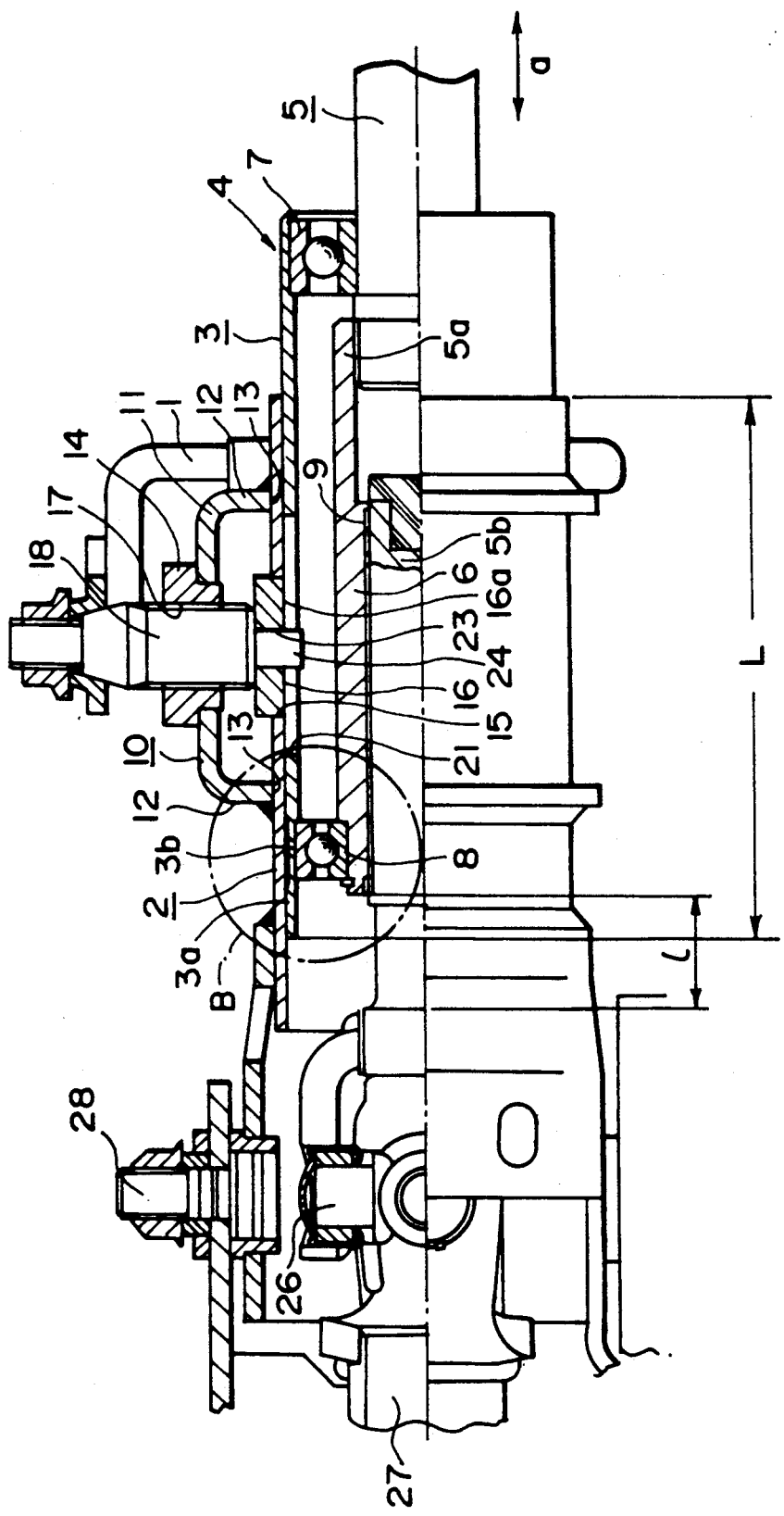
FIG. 12 is a half lateral cross sectional view which illustrates a third embodiment of the present invention.

That is, the adjustment operation is conducted in such a manner that the adjust lever 1 is operated so that the lock screw 18 is moved rearwards (upwards when viewed in FIG. 12). The lock screw 18 releases the force which abuts the lock member 16 against the outer surface of the inner column 3. As a result, a state is realized in which the inner column 3 can be freely displaced in the outer column 2. Then, the steering wheel (omitted from illustration) secured to an end portion of the drive-side steering shaft 5a is pushed or drawn so that the longitudinal position of the steering wheel is adjusted.

In accordance with the pushing/drawing of the steering wheel, the steering shaft 5a is displaced with respect to the position of the driven-side steering shaft 5b via the spline fastening portion 9. Furthermore, the inner column 3 disposed on the outer surface of the drive-side steering shaft 5a via the pair of rolling bearings 7 and 8 is displaced in the longitudinal direction. When the longitudinal position of the steering wheel has been adjusted as a result of the above-described operation, the adjust lever 1 is operated so as to forwards (downwards when viewed in FIG. 12) move the lock screw 18. The lock screw 18 abuts the lock member 6 against the outer surface of the inner column 3.

As a result, large frictional force acts between the inner surface 16a of the lock member 16 and the outer surface of the inner column 3. Therefore, the inner column 3 can be supported inside the outer column 2 in such a manner that the inner column 3 cannot be displaced. Therefore, the state in which the steering wheel is positioned at the adjusted position is maintained.

Furthermore, according to the third embodiment of the present invention of the telescopic steering column device, the outer surface of the portion 3b which is the end portion of the inner column 3 and projecting over the roller bearing 8 is brought into contact with the inner surface of the outer column 2. Therefore, the rigidity of the steering column comprising the inner column 3 and the outer column 2 against bending can be improved without a necessity of shifting the positions of the pair of rolling bearings 7 and 8 which support the inner column 3 around the drive-side steering shaft 5a.

Furthermore, the thickness of the portion 3b around the roller bearing 8 which supports the side end portion of the projection portion of the inner column 3 is reduced. Therefore, the force enlarging the outer diameter does not act on the above-described projection portion 3a after the roller bearing 8 has been press fitted into the inner column 2. As a result, the force necessary to expand/contract the steering column 4 can be restricted.

That is, although the inner diameter of the portion 3b into which the roller bearing 8 has been press-fitted is elastically enlarged, the projection 3a does not considerably receive the influence of the deformation due to the above-described press fitting of the roller bearing 8 since the rigidity of the portion 3b is reduced since the thickness of this portion is reduced. Therefore, the enlarging of the frictional force acting between the outer surface of the projection 3a and the inner surface of the outer column 2 can be prevented. Although the outer diameter of the projection 3a is temporarily enlarged at the time of press fitting the roller bearing 8, it can be restored after the roller bearing 8 has passed through.

Since the third embodiment of the present invention of the telescopic steering column device is structured and operated as described above, the rigidity of the steering column against bending can be improved without deteriorating its original advantage of large expansible/contractible length or the like.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. A telescopic steering column device comprising:
a drive-side steering shaft an end portion of which is connected to a steering wheel;
a driven-side steering shaft connected to said drive-side steering shaft in such a manner that said drive-side steering shaft can be expanded/contracted and the rotation of said drive-side steering shaft can be transmitted;
a cylindrical inner column rotatably supporting said drive-side steering shaft and having an elongated hole elongated in the axial direction;
a cylindrical outer column having an opening in the side surface thereof corresponding said elongated hole in said inner column, fastened on the outer surface of said inner column so as to be telescopically combined with said inner column and positionally fixed in the axial direction with respect to said driven-side steering shaft;
a lock bracket having a thread hole at its portion corresponding said opening in said outer column and secured to said outer column;
a lock member having a through hole at the central portion thereof and the inner surface thereof which is brought into contact with the outer surface of said inner column, said lock member being arranged to be fitted within said opening in said outer column; and
a lock screw having the inner portion which is engaged with said lock member and a projection which is formed at the central portion of said inner portion, which is rotatably inserted into said through hole of said lock member and which is inserted into said elongated hole in said inner column so that the axial displacement of said inner column with respect to the position of said outer column is allowed while the rotation of said inner column with respect to said outer column is prevented, said lock screw being driven into said thread hole in said lock bracket, whereby said inner column is secured to said outer column by abutting said inner surface of said lock member against the outer surface of said inner column by adjusting said lock screw and said inner column can be expanded/contracted with respect to said outer column by releasing said abutment.

2. A telescopic steering column device comprising:
a drive-side steering shaft an end portion of which is connected to a steering wheel;
a driven-side steering shaft connected to said drive-side steering shaft in such a manner that said drive-side steering shaft can be expanded/contracted and the rotation of said drive-side steering shaft can be transmitted;
a cylindrical inner column rotatably supporting said drive-side steering shaft;
a cylindrical outer column which has an opening in the side surface thereof, the inner diameter of which is larger than the outer diameter of said inner column, which has, at the end portion thereof, a small-diameter portion which is substantially the same as said outer diameter of said inner column, and which is telescopically combined with said inner column in such a manner that said cylindrical outer column is fitted around the outer surface of said inner column so as to make the inner surface of said small-diameter portion to be brought into contact with the outer surface of said inner column, said cylindrical outer column being positionally fixed in the axial direction with respect to said driven-side steering shaft;
a lock member having the inner surface which is brought into contact with said outer surface of said inner column and which is fitted within said opening in said outer column; and
adjust means which abuts the inner surface of said lock member against the outer surface of said inner column so that said inner column is secured to said outer column and which releases said abutment so that said inner column can be expanded/contracted with respect to said outer column.

3. A telescopic steering column device comprising:
a drive-side steering shaft an end portion of which is connected to a steering wheel;
a driven-side steering shaft connected to said drive-side steering shaft in such a manner that said drive-side steering shaft can be expanded/contracted and the rotation of said drive-side steering shaft can be transmitted;

a cylindrical inner column which supports said drive-side steering shaft via a pair of rolling bearings on the inner surface thereof;

a cylindrical outer column which is fitted around the outer surface of said inner column, and which is telescopically combined with said inner column, said cylindrical outer column being positionally fixed in the axial direction with respect to said driven-side steering shaft;

a projection which is formed on said inner column and which projects from either of said pair of rolling bearings disposed at an end portion of said inner column opposite to said steering wheel in the direction opposite to said steering wheel; and a thickness-reduced portion which is formed in said inner column and which is formed by recessing the outer surface of said inner column disposed around said either of said pair of rolling bearings.

* * * * *